(No Model.) 2 Sheets—Sheet 2.
B. B. BOLLINGER.
CANE AND CORN HARVESTER.
No. 347,316. Patented Aug. 17, 1886.
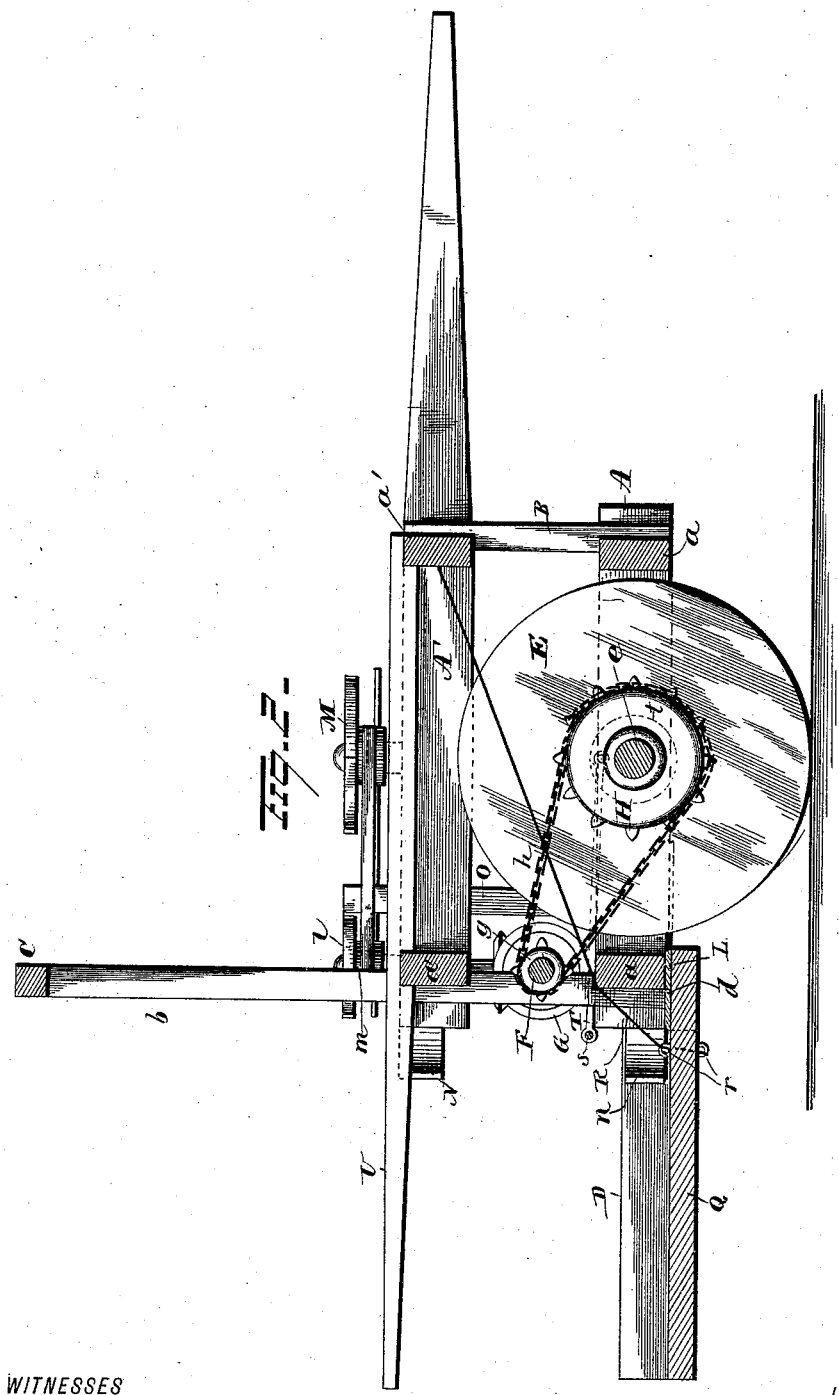
WITNESSES
S. G. Nottingham
INVENTOR
B. B. Bollinger
By H. A. Sigmon
ATTORNEY

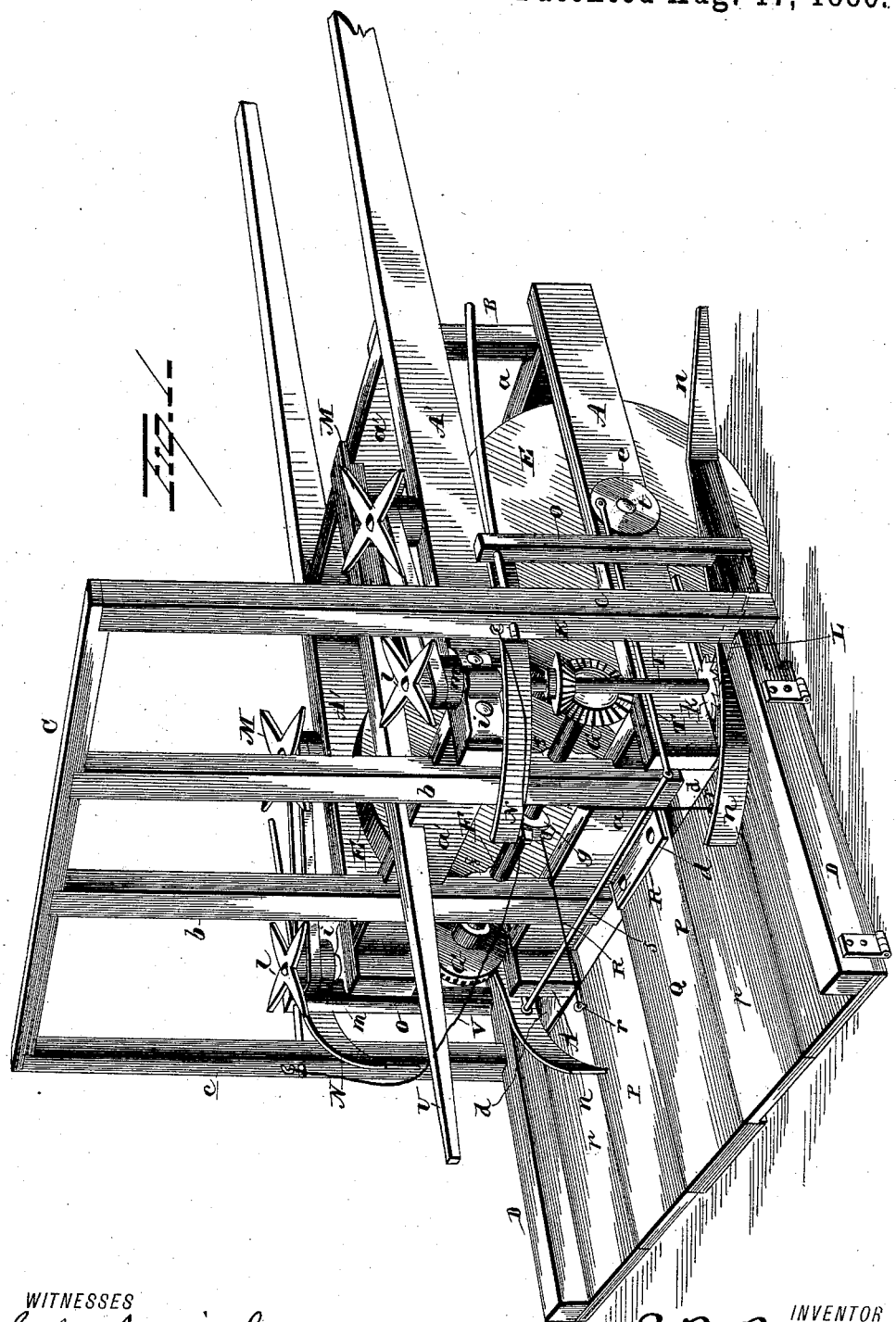

UNITED STATES PATENT OFFICE.

BENJAMIN B. BOLLINGER, OF WHITE PIGEON, MICHIGAN.

CANE AND CORN HARVESTER.

SPECIFICATION forming part of Letters Patent No. 347,316, dated August 17, 1886.

Application filed December 6, 1884. Serial No. 149,661. (No model.)

*To all whom it may concern:*

Be it known that I, BENJAMIN B. BOLLINGER, of White Pigeon, in the county of St. Joseph, and State of Michigan, have invented certain new and useful Improvements in Cane and Corn Harvesters; and I do hereby declare the following to be a full, clear, and exact description of the invention, such as will enable others skilled in the art to which it appertains to make and use the same.

My invention relates to an improvement in cane and corn harvesters, the object of the same being to provide a harvester adapted to cut and gather the standing corn into bunches of suitable size to be bound, and, further, adapted to discharge the bound bundles, a further object being to provide a harvester which shall be simple and economical in construction and durable and efficient in use; and with these ends in view my invention consists in certain features of construction and combinations of parts, as will be hereinafter described, and pointed out in the claims.

In the accompanying drawings, Figure 1 is a view of the harvester in perspective, and Fig. 2 is a longitudinal section of the same.

The main frame of the harvester is composed of a rectangular box-shaped frame consisting of the lower side rails, A, connected by the end cross-ties or girders, $a$, the upper side rails, A', (which are conveniently extended forwardly to form means of attaching the horse,) connected by the cross-girders $a'$, the uprights B, connecting the lower and upper cross-girders and rails at the front, and the uprights $b$ connecting the lower and upper girders at the rear, and extending upwardly to a height about equal to the average height of cornstalks.

A cross-bar, C, is secured on the upper ends of the uprights $b$, and projects beyond the main frame on both sides. The width of the main frame is intended to be a trifle less than the distance between the rows of corn as commonly planted, and the bar C is intended to extend on both sides of the main frame to points a little beyond the centers of the rows.

Uprights $c$ extend from the plane of the base of the main frame to the ends of the cross-bar C, and are secured at their lower ends to rearwardly-extending platform-supports D. An iron brace, $d$, extends from points beneath the uprights $c$, beneath the rear end of the main frame, and is firmly secured to the main frame and the platform-supports D, thereby binding the latter rigidly to the main frame. The main frame is supported upon a pair of wheels, E, rigidly secured on an axle, $e$, journaled in suitable bearings in the lower side rails, A. The wheels are located just inside of the rails.

A transverse shaft, F, is journaled in suitable bearings, $f$, secured to the uprights $b$ between the lower and upper rear cross-girders of the main frame. The shaft F is provided at each end with a bevel gear-wheel, G, and at the central portion with a sprocket-wheel, $g$, all secured rigidly thereon. A sprocket-wheel, H, secured rigidly on the axle $e$, is connected with the wheel $g$ by a suitable chain, $h$, through which the motion of the axle $e$ is communicated to the shaft F, and hence to the wheels G.

A pair of upright shafts, I, are journaled in suitable bearings, $i$, secured to the brace $d$ and upper rails of the main frame, one at each end of the shaft F, and are provided with bevel-pinions K, adapted to engage the wheels G, and thereby communicate motion to their shafts. The shafts I are provided with ratchet-toothed wheels $k$, in close proximity to the upper surface of brace $d$, which serve to force the stalks, as they are gathered, into direct contact with the cutters L. The shafts I are also provided with reels $l$, one or more, rigidly secured on each, for gathering and moving the stalks rearwardly as the machine advances, and with band-pulleys $m$, rigidly secured thereon for transmitting the motion of the shafts I to reels M, mounted loosely on upright studs set in the upper rail of the main frame.

Curved gathering-arms N and $n$ are secured to the uprights $c$ and to the forwardly-projecting ends of the platform-supports D, respectively, the upper arms, N, being further supported and braced by uprights O, secured at their lower ends to the platform-supports D. The arms N and $n$ curve outwardly as they extend forwardly, for the purpose of gathering any straggling stalks, and their rear ends curve inwardly to guide the cut stalks into a bunch ready for binding.

The platform on which the stalks are supported after they are cut consists of two sets of leaves, P $p$, hinged, respectively, to the platform-supports D and to a central platform-support, Q, firmly secured at its forward end to the brace d. The upper surfaces of the leaves P p are in a plane with the upper surface of the brace d, and the stalks slide smoothly from the latter onto the leaves. Each set of leaves P p is held in elevated adjustment by means of a rope or chain, R, the ends of which pass through eyes r, set near the edges of the leaves p and are secured at or near the edges of the leaves P. The loop of the rope or chain R extends forwardly to a pulley, roller, or other convenient device operated by a hand-lever, by means of which the leaves are elevated and locked in elevated adjustment and released at the pleasure of the driver.

Two pitmen, T, are attached to cranks or wheels t, secured on the outer ends of the axle e, the rear ends of the pitmen being connected by a cross-rod, s, or the pitmen and cross-rod may be formed in one piece. As the wheels E revolve, the pitmen force the rod s rearwardly, and the stalks are thereby pushed away from the arms N n and packed on the platform. When a sufficient number of stalks have gathered to form a stack or shock, the machine is stopped, the stalks are bound, the leaves P p are allowed to drop, and the machine moves on, leaving the bundles of stalks standing.

A central bar or arm, U, extends from the upper portion of the main frame rearward over the central support, Q, and forms a partition between the bunches of stalks gathered from the two rows.

A slack piece of cord, V, is secured in a convenient manner at each end to the upright c, at the height at which the stalks are to be bound, and serves while the stalks are gathering to prevent them from falling to the rear. When sufficient stalks have gathered to form a bundle, the cord V is used to bind them, and another piece is put in its place.

The operation of the harvester as a whole is so simple, and the functions of the several parts have been so fully set forth, that there is no need of further comment.

It is evident that slight changes may be made in the forms and arrangement of the several parts described without departing from the spirit and scope of my invention; hence I do not wish to limit myself strictly to the construction herein set forth; but, Having fully described my invention, what I claim as new, and desire to secure by Letters Patent, is—

1. In a corn-harvester, the combination, with a frame supported on wheels, cutters located on opposite sides of the frame, and a dropping-platform located behind the cutters, of a reciprocating rod located over the dropping-platform and adapted to pack the stalks into bundles, substantially as set forth.

2. In a corn-harvester, the combination, with a frame mounted on wheels, cutters secured to the opposite sides of said frame, and a feed located in close proximity to each cutter, of a dropping-platform located behind the cutters, and a reciprocating rod located over the dropping-platform, for packing the stalks into bundles, substantially as set forth.

3. In a corn-harvester, the combination, with the main frame, cutters, reels located above the cutters, and a dropping-platform located behind the cutters, of the upper and lower arms, curved substantially as described, and extending from a point over the dropping-platform to a point in front of the cutters, a bar located over the binder-table between the cutters, and a cord, V, for holding the stalks in a position to be bound, substantially as set forth.

4. The combination, with the main frame, the stationary cutters, the revolving feed-wheels, and curved guiding-arms, of a dropping-platform, a bar located over the platform between the cutters, and a reciprocating rod for packing the stalks into the bundles, substantially as set forth.

5. The combination, with a main frame, cutters, and stalk-guiding arms, of a bar located between the cutters, a cord, V, for holding the stalks in position, and a reciprocating bar for packing the stalks, substantially as set forth.

6. In a corn-harvester, the combination, with a main frame and stationary cutters, of a dropping-platform located behind the cutters, curved arms extending from a point over the dropping-platform to a point in front of the cutters, and the bar located between the cutters and over the dropping-platform, for preventing stalks falling from opposite sides of the machine from becoming interlocked, substantially as set forth.

7. In a corn-harvester, the combination, with a pair of supporting-wheels journaled within a box-frame, of stationary cutters located at the side of the frame, the drop-platforms, substantially as described, secured to the rear of the frame, the bar located over the drop-platform between the cutters, and means for gathering the stalks, forcing them into contact with the cutter and moving them onto the platform, substantially as set forth.

In testimony whereof I have signed this specification in the presence of two subscribing witnesses.

BENJAMIN B. BOLLINGER.

Witnesses:
HOMER HOPKINS,
JOHN R. WILLIAMS.